T. ROGERS.
REVOLVING CYLINDER STEAM ENGINE.
No. 19,715. Patented Mar. 23, 1858.
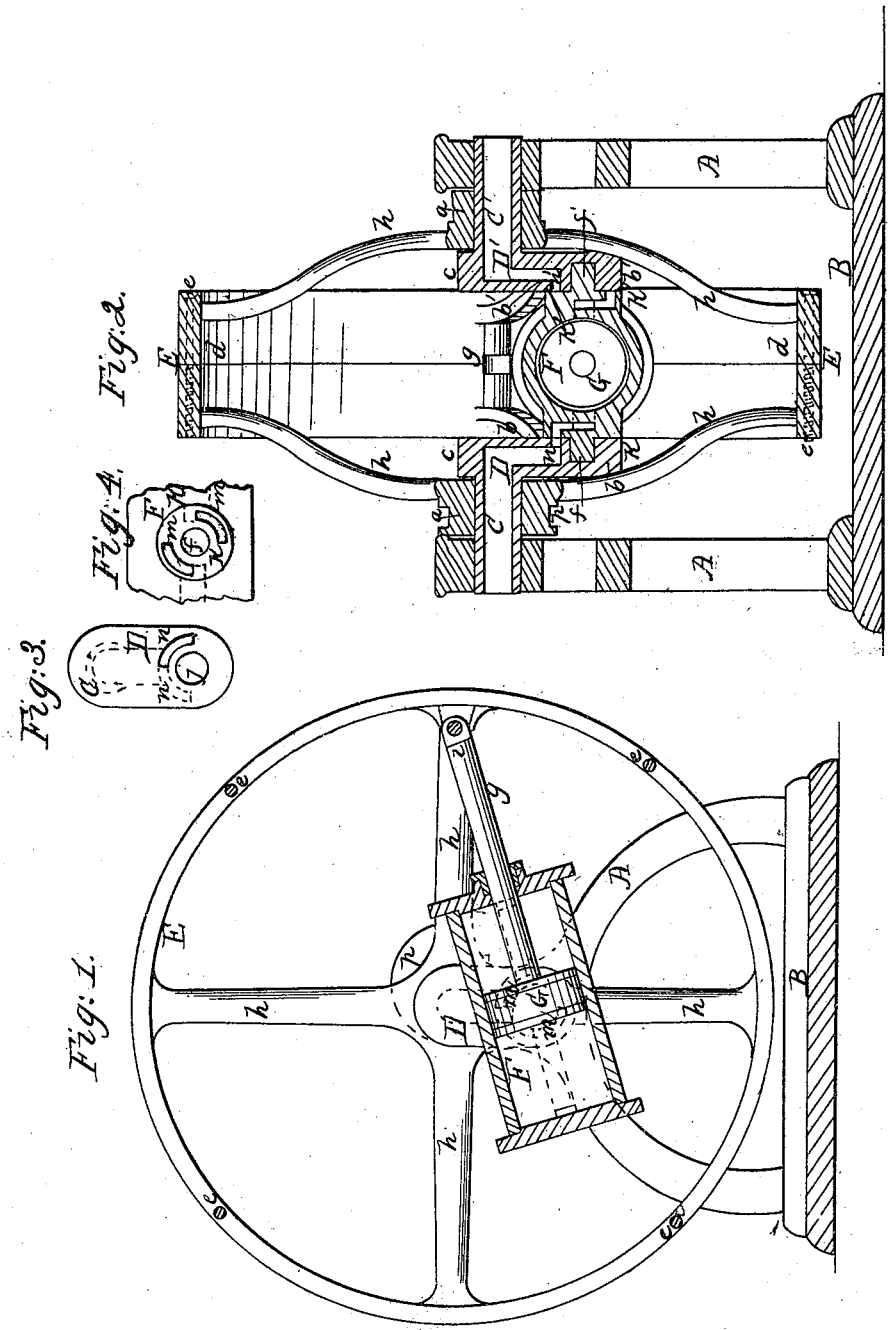

UNITED STATES PATENT OFFICE.

THOMAS ROGERS, OF PHILADELPHIA, PENNSYLVANIA.

REVOLVING-CYLINDER STEAM-ENGINES.

Specification of Letters Patent No. 19,715, dated March 23, 1858.

*To all whom it may concern:*

Be it known that I, THOMAS ROGERS, of Philadelphia, in the county of Philadelphia and State of Pennsylvania, have invented a new and useful Improvement in Revolving-Cylinder Steam-Engines; and I do hereby declare that the following is a full, clear, and exact description of the same, reference being had to the accompanying drawings, forming part of this specification, in which—

Figure 1, is a vertical section, taken transversely to the axis, of a revolving cylinder engine with my improvements. Fig. 2 is a vertical section of the same, in a plane passing through the axis. Figs. 3 and 4 are detail views of parts of the same.

Similar letters of reference indicate corresponding parts in the several figures.

This invention consists principally in two hollow stationary steam heads applied and arranged as hereinafter described to serve as journals for the main drum or fly-wheel of the engine, and bearings for the cylinder journals, while they also serve as valves to effect the induction and eduction of the steam to and from the cylinder.

To enable others skilled in the art to make and use my invention, I will proceed to describe its construction and operation.

B, is a bedplate, and A, A, are two standards erected upon it to constitute the framing of the engine.

C D, and C′ D′, are two hollow stationary steam heads, one for induction and the other for eduction, of a shape somewhat like the letter L, as shown in Fig. 2, keyed or otherwise firmly secured into the standards A, A, and occupying positions opposite each other on the inner sides of the standards. The horizontal portions C, C′, of these heads, which have their exteriors turned cylindrically, have their axes exactly in line with each other, that they may constitute a pair of coinciding stationary journals upon which are fitted the hubs $a$, $a$, of the revolving drum E, within which is placed the cylinder F, of the engine. The upright parts D, D′, of the steam-heads stand below the horizontal portions, and their opposite faces $b$, $b′$, are made perpendicular to the axis of the horizontal parts and consequently parallel with each other, as the lower parts of said faces constitute the induction and eduction valves of the engine. The form of the parts D, D′, is illustrated in Fig. 3, which is a face view of the steam head C, D, and also shown (but not so fully) in Fig. 1. These parts are made wide enough to form shoulders $c$, $c$, all around the parts C, C′, as is shown in Fig. 2, to confine the hubs $a$, $a$, of the drum E. This drum is made in two parts, each part consisting of a hub $a$, arms $h$, $h$, and rim, the two rims uniting in the line $d$, $d$, Fig. 2, and being bolted together by bolts $e$, $e$, passing through them. The reason for thus making the drum is to afford convenience for getting the cylinder and steam heads into their places.

The trunnions, or more properly speaking, the journals $f$, $f′$, of the cylinder F, are solid and are received in bearings near the bottoms of the upright parts D, D′, of the steam heads one of which bearings is shown in Fig. 3, indicated by $j$. The axis of the cylinder journals, when they are in their bearings is parallel with the axis of the stationary journals which are provided on the parts C, C′, of the steam heads to receive the hubs of the drum E, and the distance between the axis of the cylinder journals and drum journals being equal to half the intended length of stroke of the piston G, which is fitted to the cylinder to work like the piston of a reciprocating engine and whose rod $g$, is connected by a pin $i$, with the drum. The cylinder thus arranged and connected, having steam admitted to opposite ends alternately like the cylinder of a reciprocating engine, to produce a reciprocating motion of the piston, is caused to receive, itself, and impart to the drum E, a rotary motion both in the same direction.

The induction and eduction of steam is effected by the revolution of the cylinder, through a double set of steam passages, one set on each side of the cylinder, the set on one side being for the induction of the steam to opposite ends of the cylinder and the set on the opposite side for eduction. These passages terminate in ports in two faces $k$, $k$, which surround the journals $f$, $f′$, of the cylinder, and which fit to the faces $d$, and $d′$, of the steam heads C D, and C′ D′. The ports $m$, $m$, of the face $k$, are shown in Fig. 4; those on the opposite side of the cylinder are just like them but arranged opposite the spaces between $m$, $m$. The valve space of the steam head C D, contains a port $n$, of same form as $m$, $m$, and arranged so that each of those ports will come into communication with it in its turn. The valve face of the opposite steam head contains a port similar to n, but instead of being arranged opposite to that port it occupies a reverse position as represented in red outline and indicated by n', in Fig. 3. This arrangement of the passages and ports in the cylinder and steam heads will cause the revolution of the cylinder to bring each end of the cylinder in turn into communication with the hollow steam head C D, and always bring the opposite end at the same time into communication with the other steam head C' D', always opening the communication just at the ends of the stroke. One of the steam heads having the induction and the other the eduction pipe connected with it, it is obvious how the induction and eduction of steam is effected. By a suitable arrangement of the pipes and a four-way cock or some equivalent to make either steam head C D, or C' D', the induction head and the other the eduction, the engine may be made to rotate in either direction.

The power from the engine is transmitted by a belt from the drum E, which also constitutes a fly-wheel, but the drum may be constructed with gearing on its periphery or have gears attached to its sides. I have shown attached to one of the hubs a, a, an eccentric p, for driving the feed pump.

The revolving cylinder engine constructed as described makes one of the cheapest engines ever contrived, as its parts are few, it requires very little fitting and very little framing is necessary.

I do not claim the arrangements of ports and passages for the induction and eduction of steam. But

What I claim as my invention, and desire to secure by Letters-Patent, is:—

The two L-shaped stationary hollow steam heads C D, C' D', applied and arranged substantially as described, to constitute stationary journals for the two-hubbed drum or fly-wheel E, and bearings for the cylinder journals, while they also constitute valves for the induction and eduction of the steam, substantially as herein described.

THOMAS ROGERS.

Witnesses:
 ALEXR. MARTIN,
 CHARLES CARTY.